(12) United States Patent
Ruggiero et al.

(10) Patent No.: US 8,100,586 B2
(45) Date of Patent: Jan. 24, 2012

(54) FIBER OPTIC SENSING DEVICE AND METHOD FOR MONITORING FOIL BEARINGS

(75) Inventors: Eric John Ruggiero, Rensselaer, NY (US); Hua Xia, Altamont, NY (US); Bugra Han Ertas, Albany, NY (US); Matthew Kaminske, Byfield, MA (US)

(73) Assignee: General Electric Company, Niskayuna, NY (US)

( * ) Notice: Subject to any disclaimer, the term of this patent is extended or adjusted under 35 U.S.C. 154(b) by 860 days.

(21) Appl. No.: 12/165,303

(22) Filed: Jun. 30, 2008

(65) Prior Publication Data

US 2009/0324148 A1 Dec. 31, 2009

(51) Int. Cl.
*F16C 32/06* (2006.01)
*F16C 17/24* (2006.01)
*F01B 25/04* (2006.01)

(52) U.S. Cl. .................. 384/103; 384/106; 415/118

(58) Field of Classification Search .......... 384/103–106, 384/119, 215, 123; 123/246; 415/118; 356/73.1
See application file for complete search history.

(56) References Cited

U.S. PATENT DOCUMENTS

| | | | | |
|---|---|---|---|---|
| 4,262,975 | A * | 4/1981 | Heshmat et al. | 384/119 |
| 4,415,281 | A * | 11/1983 | Agrawal | 384/103 |
| 4,767,222 | A * | 8/1988 | Paletta et al. | 384/106 |
| 5,427,455 | A * | 6/1995 | Bosley | 384/103 |
| 6,770,993 | B1 * | 8/2004 | Heshmat et al. | 310/90.5 |
| 6,921,207 | B2 | 7/2005 | Matsunaga | |
| 6,953,283 | B2 * | 10/2005 | Matsunaga | 384/103 |
| 7,056,025 | B2 * | 6/2006 | Nakata | 384/103 |
| 7,070,330 | B2 * | 7/2006 | Agrawal | 384/106 |
| 7,151,872 | B1 | 12/2006 | Xia et al. | |
| 7,648,279 | B2 * | 1/2010 | Struziak et al. | 384/103 |
| 2006/0215959 | A1 | 9/2006 | McCarth et al. | |
| 2007/0246002 | A1 * | 10/2007 | Taniguchi et al. | 123/246 |
| 2008/0212082 | A1 * | 9/2008 | Froggatt et al. | 356/73.1 |
| 2009/0087303 | A1 * | 4/2009 | Ruggiero et al. | 415/118 |

FOREIGN PATENT DOCUMENTS

JP 2007270647 A * 10/2007

* cited by examiner

*Primary Examiner* — Marcus Charles
(74) *Attorney, Agent, or Firm* — Scott J. Asmus

(57) ABSTRACT

A rotary machine includes a rotary component disposed to rotate with respect to a stationary component. A foil bearing is disposed between the stationary component and the rotary component and configured to rotatably support the rotary component. A fiber optic sensing system including one or more fiber optic sensors is disposed in the foil bearing and configured to detect one or more parameters related to the foil bearing.

23 Claims, 6 Drawing Sheets

FIBER OPTIC SENSING DEVICE AND METHOD FOR MONITORING FOIL BEARINGS

BRIEF SUMMARY

The invention relates generally to bearings, and more particularly, to a fiber optic sensing device and method for detecting multiple parameters of a foil bearing.

BACKGROUND

Foil bearings are one attractive bearing option for certain rotating machine applications. A foil bearing typically includes a housing surrounding a rotor shaft and a plurality of thin foil-like plates or layers disposed in a space or gap between the rotor shaft and the bearing housing, and arranged in a circumferential direction in such a manner that each of the foils is attached to the housing in a cantilever fashion with its free end being urged toward the rotor shaft. As the rotor shaft rotates, a fluid such as ambient air is drawn in between the rotor shaft and the foils, creating a fluid film between an outer surface of the rotor shaft and the foils to allow the rotor shaft to rotate with lower friction by essentially floating on the film. Foil bearings that support loads via a fluid film formed as a result of the rotor shaft rotation may be referred to as hydrodynamic foil bearings.

A significant limitation in the application of foil bearings results from a difficulty in determining wear or, more generally, the state of the bearing. Currently, one known indicator of foil bearing wear is the detection of large thermal spikes that develop because of a severe rotor rub against the foil bearing. These transient rubs may occur because of poor fluid film development between the foil and the rotor. Foreign particle ingestion (e.g., sand) or severe radial rotor load transients that exceed the capability of the developed film may also contribute to wear of the foil bearing.

Various sensing devices are known and are generally in use. For example, thermocouples are used for measuring the temperature in components of a device, such as exhaust systems, combustors, turbomachineries, and so forth. In certain other instances, sensing systems such as strain gages are employed to detect physical parameters such as strain in an infrastructure. However, such conventional sensing devices are limited by the operational conditions in which they may be employed. For example, conventional sensing devices are often limited to relatively mild temperature conditions and, as such, limited operational temperature ranges. In other words such conventional devices are not suitable for monitoring foil bearings operating at higher temperature and pressure conditions. Moreover, most sensing devices are simply unsuited to the fine placement that would be needed in a foil bearing application to avoid disturbing the bearing operation. In any event, current applications for foil bearings do not actively monitor bearing conditions with any of these conventional techniques.

There is a need for a device and method that is employed to effectively detect multiple parameters of a foil bearing provided in a machine, for example, in a rotary machine.

BRIEF DESCRIPTION

In accordance with one exemplary embodiment of the present invention, a rotary machine includes a rotary component disposed to rotate with respect to a stationary component. A foil bearing is disposed between the stationary component and the rotary component and configured to rotatably support the rotary component. A fiber optic sensing system including one or more fiber optic sensors is disposed in the foil bearing and is configured to detect one or more parameters related to the foil bearing.

In accordance with another exemplary embodiment of the present invention, a foil bearing system includes a top foil disposed in a bearing shell. A bump foil is disposed between the bearing shell and the top foil. A fiber optic sensing system including one or more fiber optic sensors is disposed in the bearing shell; on the top foil; or both and is configured to detect one or more parameters related to the foil bearing system.

In accordance with another exemplary embodiment of the present invention, a method for detecting one or more parameters related to the foil bearing system is provided.

BRIEF DESCRIPTION OF THE SEVERAL VIEWS OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention include a rotary machine having a rotary component disposed to rotate with respect to a stationary component. The machine includes a foil bearing disposed between the stationary component and the rotary component and configured to rotatably support the rotary component. A fiber optic sensing system having one or more fiber optic sensors is disposed in the foil bearing and configured to detect one or more parameters related to the foil bearing. In accordance with another exemplary embodiment of the present invention, a foil bearing system having a fiber optic sensing system is disclosed. In accordance with another exemplary embodiment of the present invention, a method used to monitor the health of a foil bearing system is disclosed. The exemplary fiber optic sensors and sensing instrumentation have the capability to withstand substantially higher temperatures (for example, temperature greater than 538 degrees Celsius). In one embodiment, the fiber optic sensing system has potential for health diagnosis and prognosis of foil bearings by detecting temperature, strain, pressure and vibration induced signals. As the foil bearing operates through a typical operating profile, the distributed sensor network of fiber optic sensors monitors the thermal response of the foil bearing. When measured or sensed temperature exceeding a predefined temperature, the system logs the location, duration, and severity of the exceedance. This data is then used by a monitoring system to determine if the foil bearing is still operating within normal operating limits.

Embodiments of the present invention provides a real time and accurate feedback of data pertaining to temperature, strain, or the like of a foil bearing operating in an environment, for example, a turbomachinery environment. As a result, it is possible to determine the working condition or performance of the foil bearing. Proactive measures may be undertaken to avoid machine downtime or process inefficiency based on the sensed data. Also, the fiber sensing system operates effectively in harsh environments, such as high temperature conditions, harsh oil conditions, or the like.

Figure 1:
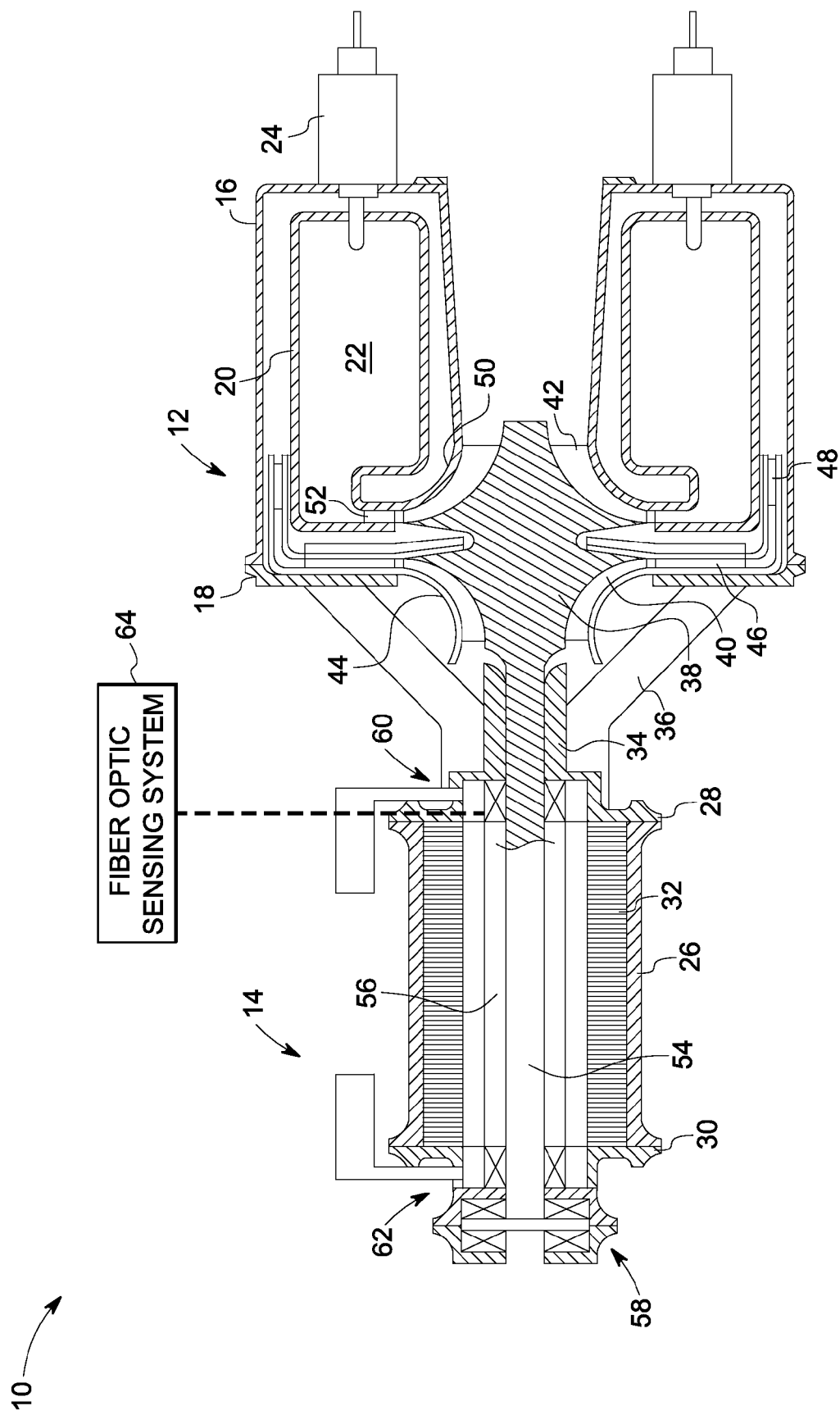
FIG. 1 is a diagrammatical view of a gas turbine generator having a foil bearing system and a fiber optic sensing system configured to detect one or more parameters related to the foil bearing system.

Referring to FIG. 1, a rotary machine 10 in accordance with exemplary aspects of the present invention is illustrated. In the illustrated embodiment, the rotary machine 10 is a gas turbine generator. The rotary machine 10 may include other types of machine employing foil bearings. It may also be noted that the present invention is not limited to use with any particular machine and may be associated with other machines employing foil bearings subjected to harsh environmental conditions during operation. For example, the present invention is applicable for foil bearing applications in combustors, coal gasifiers, aircraft engines, compressors, boilers, petroleum drilling applications, petrochemical processes, or the like.

The exemplary rotary machine 10 includes a gas turbine engine 12 as a power source and an electric generator 14 driven by the gas turbine engine 12. The gas turbine engine 12 includes an annular main housing 16 having a closed end remote from the generator 14. An end plate 18 is attached to an open end of the main housing 16, and a perforated annular inner housing 20 is coaxially received inside the main housing 16 to define a combustion chamber 22 therein. A plurality of fuel injectors 24 each have a nozzle end projecting into the combustion chamber 22.

The generator 14 includes a cylindrical main housing 26 and a pair of end plates 28 and 30 attached to either axial end of the main housing 26. The main housing 26 coaxially receives a stator coil 32 therein. The end plate 28 facing the gas turbine engine 12 is provided with a tubular extension 34 extending centrally from the end plate 28 towards the gas turbine engine 12. Also, the end plate 28 facing the gas turbine engine 12 is coupled to the opposite end plate 18 of the gas turbine engine 12 by a plurality of stay members 36.

The gas turbine engine 12 is additionally provided with an integral rotor shaft 38 carrying a compressor wheel 40 and a turbine wheel 42. The compressor wheel 40 and turbine wheel 42 include a plurality of compressor blades and turbine blades, respectively. The compressor wheel 40 forms a radial compressor section in cooperation with a shroud 44 formed by a part of the end plate 18 coupled to the gas turbine main housing 16. An inlet end of the compressor section opens out in the axial direction to face the generator. An outlet end of the compressor section communicates with a gap defined between the main housing 16 and the inner housing 20 via a diffuser 46 and an array of stator vanes 48 arranged along a circumferential direction.

The turbine wheel 42 forms a radial turbine section in cooperation with a turbine casing 50 formed by a part of the main housing 16. An inlet end of the turbine section communicates with an outlet end of the combustion chamber 22 via an inlet nozzle 52. In the illustrated embodiment, the combustion chamber 22 extends from the inlet end of the turbine section in a direction away from the generator 14. The outlet end of the turbine section opens out in the axial direction facing away from the generator 14.

The integral rotor shaft 38 further includes a generator shaft 54, which is an integral extension of the rotor shaft 38, and is passed centrally through the generator 14. A plurality of permanent magnet pieces 56 is mounted to the generator shaft 54 to form the main functional part of the generator in cooperation with the stator coil 32. A thrust bearing 58 is provided at the end portion of the rotor shaft 38. Further, a pair of journal bearings 60, 62 are provided in the end plates 28, 30 to rotatably support the rotor shaft 38 at two points. A fiber optic sensing system 64 is configured to monitor the health of the foil bearings 60, 62. In the illustrated embodiment, the fiber optic sensing system 64 is coupled to the foil bearing 60. During operation of the machine, the sensing system 64 is configured to detect one or more parameters related to the foil bearing 60 including temperature, strain, pressure, vibration, or combinations thereof. As a result, the working condition and performance of the foil bearing 60 may be determined based on the sensed data. The details of the fiber optic sensing system 64 are explained in greater detail with reference to subsequent figures.

Figure 2:
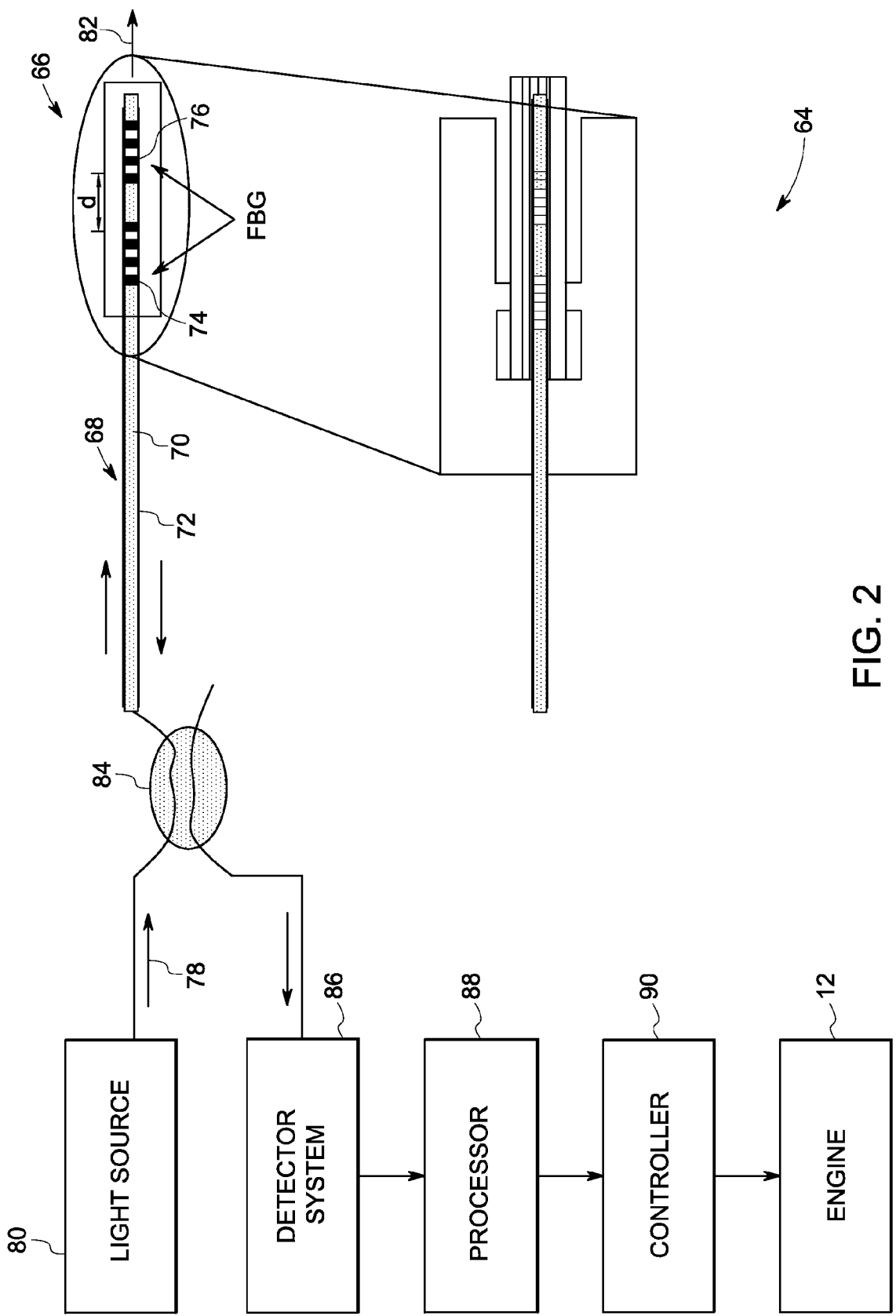
FIG. 2 is a diagrammatical view of a fiber optic sensing system.

Referring to FIG. 2, a fiber optic sensing system 64 is shown in accordance with the exemplary embodiment illustrated in FIG. 1. The fiber optic sensing system 64 includes one or more fiber Bragg grating-based sensors (also referred as "fiber optic sensors") 66 disposed in the foil bearing 60 (shown in FIG. 1) and configured to detect one or more parameters related to the foil bearing. Each sensor 66 includes a fiber optic sensing cable 68 and fiber Bragg grating elements 74, 76 that are configured for periodic refractive index modulation. The fiber optic sensing cable 68 includes a core 70 and a cladding 72 that is disposed circumferentially about the core 70. In some embodiments, the cladding 72 may include a metallic coating layer. Grating elements 74, 76 are spaced apart by a predetermined distance "d" within the core 70 and are configured to reflect in phase, wavelengths of light corresponding to a period of the grated elements 74, 76. The grating elements 74, 76 may include photosensitive-doped fiber inscribed grating elements, quartz fiber grating elements, sapphire fiber grating elements, or combinations thereof. The cladding 72 provides for near total internal reflection of light within the cable 68, thereby allowing light to be transmitted by and axially through the cable 68. The plurality of grating elements 74, 76 have different modulation periodicity, so that their resonant peaks are of different central wavelengths. Although only two grating elements 74, 76 are illustrated, in other embodiments, more than two grating elements may be used.

During operation, an input light signal 78 is provided from a light source 80 to the sensing cable 68, and a portion of the input light signal 78 is reflected by the grating elements 74, 76 in phase and corresponding to certain wavelengths of light, while remaining wavelengths are transmitted as represented by a transmitted signal 82. The product of the effective index of refraction of the grating elements 74, 76 and the periodicity of the grating elements 74, 76 define the wavelength of light reflected in phase by the grating elements 74, 76.

The exemplary sensors facilitate distributed sensing of multiple parameters and are capable of withstanding harsh environmental conditions such as elevated temperatures and high pressures. It should be noted that fiber Bragg grating elements providing indication of temperature, strain, pressure, vibration, or the like may either be collocated or in separate sensing cables either by changing its grating length or by changing its effective refractive index, namely, $\Delta\lambda=2\Lambda\Delta n+2n\Delta\Lambda$; where relative change in wavelength, $\lambda$, is determined by relative changes in refractive index, n, and grating periodicity, $\Lambda$.

The sensing system 64 also includes an optical coupler 84 configured to regulate the incoming light signal 78 from the light source 80 and also the reflected signals from the sensing cable 68. The optical coupler 84 directs the appropriate reflected signals to a Fabry-Perot interferometer based filter (not shown) and then to a detector system 86 such as an InGaAs photo detector system. The detector system 86 receives the reflected optical signals from the cable 68 and provides an output signal to a processor 88. The processor 88 is configured to analyze embedded information in the output signal from the detector system 86 and estimate a condition or a plurality of parameters of the foil bearing based upon a diffraction peak generated from the plurality of grating elements 74, 76 of the cable 68. Parameters may include temperature, strain, pressure, vibrations, or the like. The exemplary sensing cable 68 generates multiple strong Bragg peaks, thereby facilitating segregation of various parameters.

In the illustrated embodiment, the first grating element 74 is configured to reflect a first wavelength of light in phase. The reflected optical signal from the grating element 74 may be indicative of temperature in the foil bearing. Also, the second grating element 76 is configured to reflect a second wavelength of light in phase. The reflected optical signal from the grating element 76 may be indicative of strain, or both strain and temperature, in the foil bearing. An output signal indicative of the parameters of the foil bearing may be transmitted to an output device such as a controller, personal computer, personal device, laptop, or server. The output information may be used to address concerns or effectuate changes in the machine. In the illustrated embodiment, the output signal from the processor 88 is transmitted to a controller 90 coupled to the engine 12. In a presently contemplated embodiment, the controller 90 is configured to throttle the engine 12 when the detected one or more parameters of the foil bearing exceeds a threshold limit. In another embodiment, the controller 90 is configured to determine trending of one or parameters related to the foil bearing. In another embodiment, the controller 90 generates an alarm signal when the detected one or more parameters related to the foil bearing exceeds a threshold limit.

The sensors may include uniformed, blazed, and apodized fiber Bragg grating-based sensors. These fiber Bragg gratings may be manufactured by periodic modulation of alternative over- and under-constrained O—Si—O tetrahedral structure in the fiber core. As a result, fiber Bragg gratings are ideal for sensing applications involving higher temperatures. One advantage of the use of fiber Bragg gratings as temperature sensors is that multiple sensors can be inscribed onto a single fiber optic line, thus making distributed sensing quite convenient without using multiple cables. Further, with proper mechanical packaging design, fiber Bragg grating sensor lines can survive operating temperatures greater than 800 degrees Celsius.

In one embodiment as discussed above, during operation, an input light signal is provided from the light source to the sensing cable and a portion of the input light signal is reflected by the Bragg grating element in phase and corresponding to a certain wavelength of light. The exemplary sensor utilizes a wavelength encoding within the core 70 to measure a parameter based upon a Bragg resonant wavelength shift that is determined by the product of the effective core refractive index and periodicity of the grating modulation. The grating element may be tilted upwards when there is a tensile strain at the bearing-rotor interface during operation of the machine. This results in an upward shift in wavelength of light reflected from the grating element. Tensile strain may be detected based on the upward shift in wavelength of reflected light signal. Also, the grating element may be tilted downwards when there is a compressive strain at the seal-rotor interface during operation of the machine. This results in downward shift in wavelength of light reflected from the grating element. Compressive strain may be detected based on downward shift in wavelength of reflected light signal. Similarly in other embodiments one or more parameters may be detected based on shift in wavelength of light signals reflected from plurality of grating elements.

In another embodiment, the sensors may include long period grating sensors. In yet another embodiment, the sensors may include Fabry-Perot interferometer-based cavity sensors. The number of sensors may vary depending upon the application.

Figure 3:
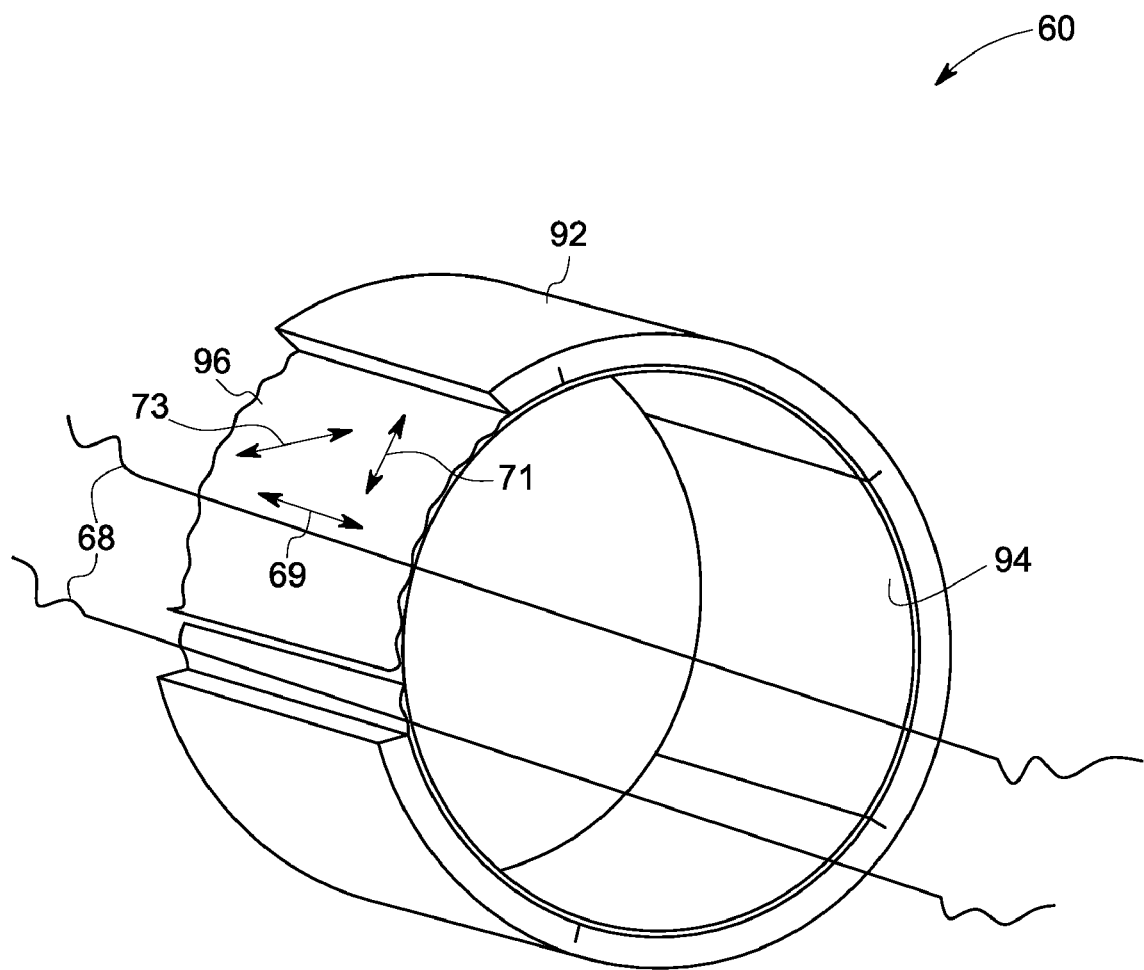
FIG. 3 is a diagrammatical view of a foil bearing system having a fiber optic sensing system and configured to detect one or more parameters related to the foil bearing system.

FIG. 3 is a diagrammatical view of a foil bearing 60 having a fiber optic sensing system. The foil bearing 60 includes a bearing shell 92, a top foil 94, and a bump foil 96 disposed between the bearing shell 92 and the top foil 94. In the illustrated embodiment, a plurality of fiber optic sensing cables 68, which extend along an axial direction 69, are provided spaced apart around the circumference of the top foil 94. In another embodiment, the fiber optic sensing cables 68 are provided spaced apart along a circumferential direction 71 around the circumference of the top foil 94. In yet another embodiment, the fiber optic sensing cables 68 are provided spaced apart along a helical direction 73 around the circumference of the top foil 94. The number of sensing cables required for circumferential or helical configurations is less than an axial configuration. In yet another embodiment, the fiber optic sensing cables are provided along combinations of axial, circumferential, and helical directions 69, 71, and 73 around the circumference of the top foil 94. As discussed above, each fiber optic sensing cable 68 includes a core and a cladding disposed circumferentially about the core. A series of grating elements is spaced apart by a predetermined distance "d" within the core and are configured to reflect in phase, wavelengths of light corresponding to a grating period of the grated elements. The use of distributed fiber optic sensors enables fine spatial distribution within the foil bearing 60.

Figure 4:
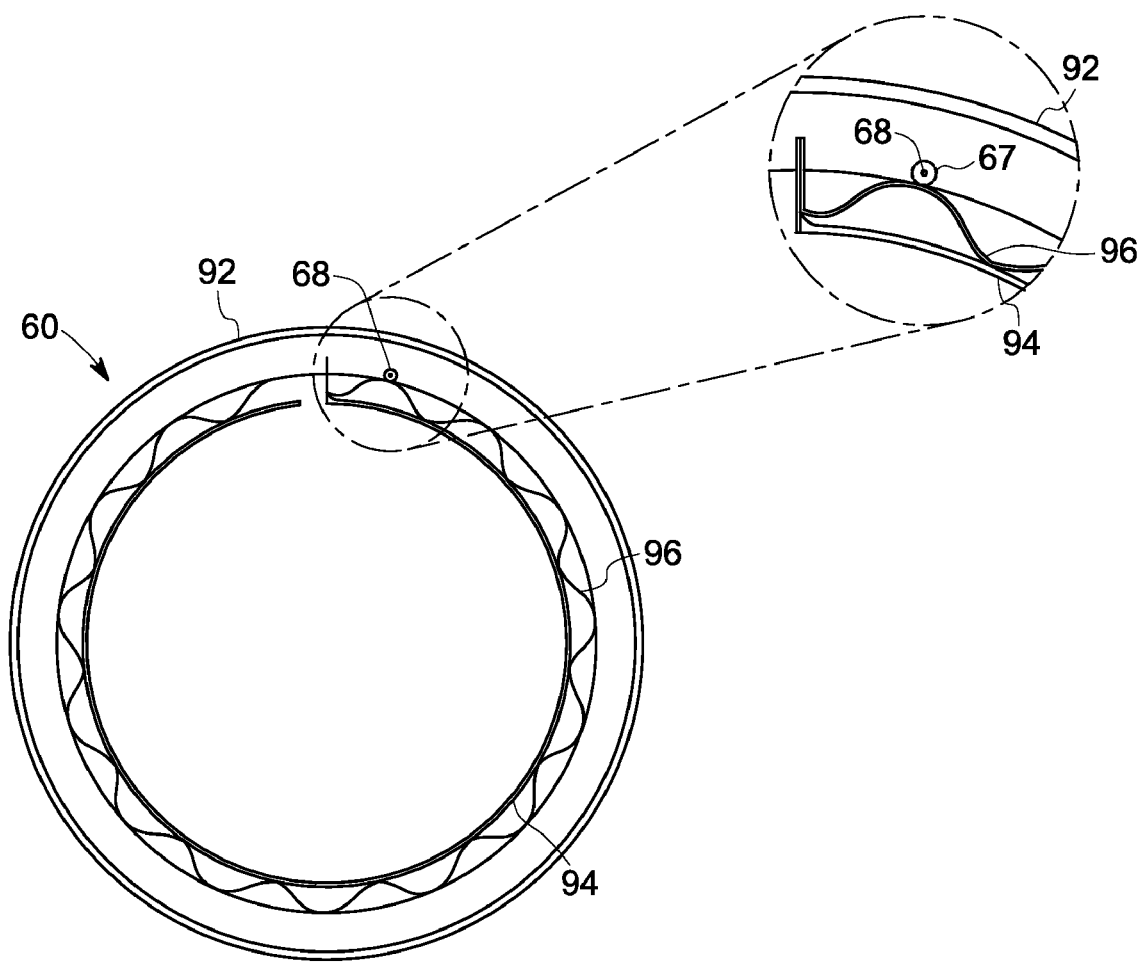
FIG. 4 is a diagrammatical view of a foil bearing system including a fiber optic sensing system having fiber optic sensors disposed in a bearing shell.

FIG. 4 is a diagrammatical view of an instrumented foil bearing 60 in accordance with an exemplary embodiment of the present invention. With reference to FIG. 4, the foil bearing 60 includes a bearing shell 92, a top foil 94, and a bump foil 96 disposed between the bearing shell 92 and the top foil 94. A plurality of fiber optic sensing cables 68 is disposed spaced apart along an axial direction 75 in the bearing shell 92. In the illustrated embodiment, the fiber optic sensing cables 68 are disposed along grooves 67 provided in the bearing shell 92. In some embodiments, the grooves 67 may also be provided along the axial direction 69 (shown in FIG. 3), or circumferential direction 71 (shown in FIG. 3), or helical direction 73 (shown in FIG. 3), or combinations thereof in the bearing shell 92 for holding the plurality of fiber optic sensing cables 68. In one embodiment, the cladding of the fiber optic sensing cable 68 is spot welded to the grooves 67 provided in the top foil 94. In some embodiments, the cladding of the fiber optic sensing cable 68 may be coupled to the grooves 67 using adhesive, such as epoxy adhesive, or ceramic adhesive, or combinations thereof. The number of grooves may vary depending on the application. The provision of sensing cables in grooves 67 in the bearing shell 92 facilitates easy assembling and dissembling of cables from the grooves 67 during repair and replacement requirements. In certain embodiments, the bearing shell 92 is devoid of grooves and the sensing cables 68 are embedded within the bearing shell 92. The embedding of sensing cables 68 in the bearing shell 92 enables to prevent damage of sensing cables 68 from the surrounding harsh environmental conditions. Hence the exemplary sensing system is maintained more robustly.

In another embodiment, the plurality of fiber optic sensing cables 68 is disposed spaced apart along a circumferential direction 71 (shown in FIG. 3) in the bearing shell 92. In yet another embodiment, the plurality of sensing cables 68 is disposed spaced apart along a helical direction 73 (shown in FIG. 3) in the bearing shell 92. In yet another embodiment, the plurality of sensing cables 68 is disposed along combinations of axial, circumferential, and helical directions 69, 71, and 73 in the bearing shell 92. In the illustrated embodiment, only one fiber optic sensing cable is shown.

Figure 5:
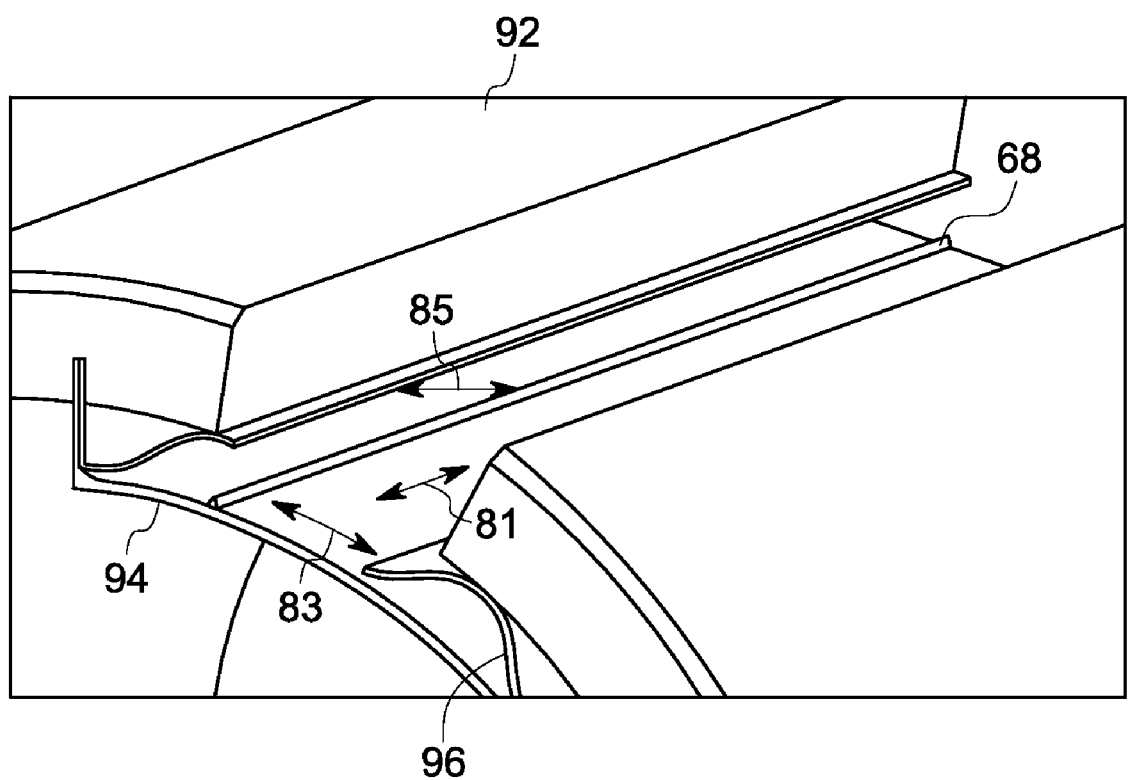
FIG. 5 is a diagrammatical view of a dissembled foil bearing system including a fiber optic sensing system having fiber optic sensors disposed on a top foil.

Referring now to FIG. 5, a foil bearing 60 in accordance with another exemplary embodiment of the present invention is illustrated. In the illustrated embodiment, the foil bearing 60 includes a bearing shell 92, a top foil 94, and a bump foil 96 disposed between the bearing shell 92 and the top foil 94. A plurality of fiber optic sensing cables 68 is disposed spaced apart along an axial direction 81 on the top foil 94. In another embodiment, the plurality of fiber optic sensing cables 68 is disposed spaced apart along a circumferential direction 83 on the top foil 94. In yet another embodiment, the plurality of sensing cables 68 is disposed spaced apart along a helical direction 85 on the top foil 94. In yet another embodiment, the plurality of sensing cables 68 is disposed along combinations of axial, circumferential, and axial directions 81, 83, and 85 on the top foil 94. In the illustrated embodiment, only one fiber optic sensing cable 68 is shown. In the illustrated embodiment, the provision of sensing cables 68 proximate to the top foil facilitates more reliable sensing of the foil bearing parameters.

Figure 6:
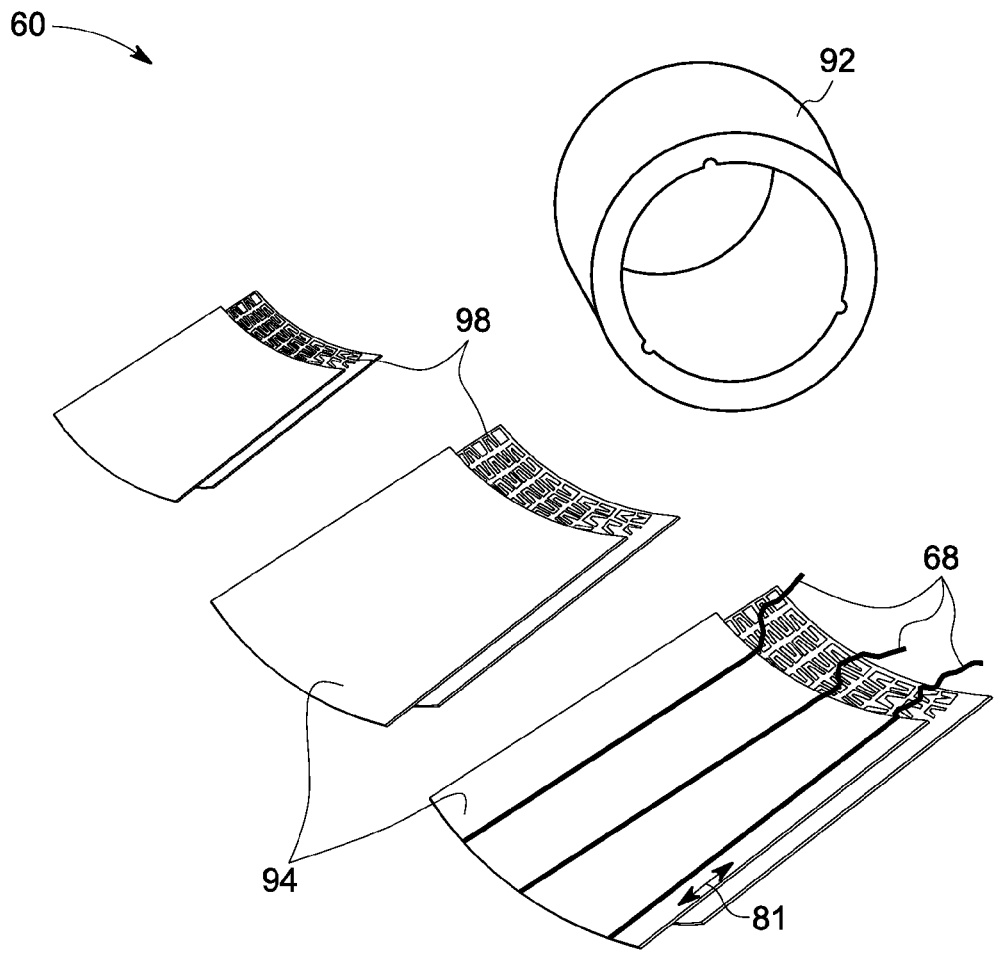
FIG. 6 is a diagrammatical view of a foil bearing system including a fiber optic sensing system having fiber optic sensors disposed on a top foil.

Referring now to FIG. 6, a foil bearing 60 in accordance with yet another exemplary embodiment of the present invention is illustrated. The foil bearing 60 includes a bearing shell 92, a top foil 94, and a backing spring 98 disposed between the bearing shell 92 and the top foil 94. The bearing shell 92 may include a plurality of slots (e.g., T-shaped slots) for holding the top foil 94 and the backing spring 98 against the bearing shell 92.

Figure 7:
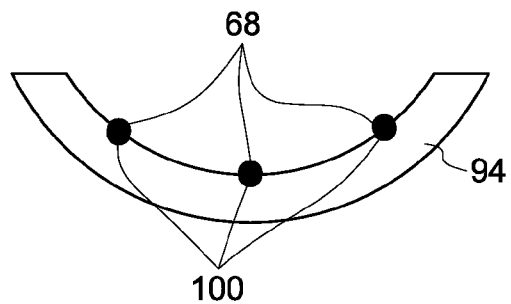
FIG. 7 is a diagrammatical view of fiber optic sensors disposed on a top foil.

Referring now to FIG. 7, a plurality of fiber optic sensing cables 68 may be disposed spaced apart in grooves 100 provided along the axial direction 81 in the top foil 94. In another embodiment, the grooves 100 may be provided along the circumferential direction on the top foil 94. In yet another embodiment, the grooves 100 may be provided along the helical direction on the top foil 94. In one embodiment, the cladding of the fiber optic sensing cable 68 is spot welded to the grooves 100 provided in the top foil 94. In some embodiments, the cladding of the fiber optic sensing cable 68 may be coupled to the grooves using epoxy adhesive, or ceramic adhesive, or combinations thereof. In certain embodiments, the top foil 94 is devoid of grooves and the sensing cables 68 are embedded within the top foil 94. Here again, similar to the embodiment illustrated in FIG. 4, the provision of sensing cables 68 in grooves 100 in the top foil 94 facilitates easy assembling and dissembling of cables 68 from the grooves 100 during repair and replacement requirements.

In accordance with embodiments of the present invention discussed above, multiple fiber optic lines may be mechanically coupled to the foil bearing. As the foil bearing cycles through normal operation, the distributed sensing array monitors the thermal gradient across the bearing. In the event of a severe rub or abnormal operation of the rotor, the sensor network captures both the spatial and temporal thermal response of the bearing. The use of distributed sensors enables fine spatial distribution within the sensing network without the consequence of significant mass and wiring complexity as many sensors can fit on a single fiber optic line.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A rotary machine, comprising:
a stationary component;
a rotary component disposed to rotate with respect to the stationary component;
a foil bearing disposed between the stationary component and the rotary component and configured to rotatably support the rotary component, and
a fiber optic sensing system comprising one or more fiber optic sensors disposed in the foil bearing and configured to detect one or more parameters related to the foil bearing, wherein the one or more fiber optic sensors are disposed in a plurality of grooves provided in the foil bearing.

2. The rotary machine of claim 1; wherein the foil bearing comprises a bearing shell; a top foil; and a bump foil disposed between the bearing shell and the top foil; wherein the fiber optic sensors are disposed in the bearing shell; on the top foil; or both.

3. The rotary machine of claim 2; wherein the fiber optic sensors are disposed along an axial direction along the bearing shell.

4. The rotary machine of claim 2, wherein the fiber optic sensors are disposed along a circumferential direction along the bearing shell.

5. The rotary machine of claim 2; wherein the fiber optic sensors are disposed along an axial direction in the bearing top foil.

6. The rotary machine of claim 2, wherein the fiber optic sensors are disposed along a circumferential direction in the bearing top foil.

7. The rotary machine of claim 2; wherein the fiber optic sensors are disposed helically along the bearing shell; top foil; or combinations thereof.

8. The rotary machine of claim 2; wherein the fiber optic sensors are disposed in a plurality of grooves provided in the bearing shell, and the top foil.

9. The rotary machine of claim 2; wherein the fiber optic sensors are embedded in the bearing shell.

10. The rotary machine of claim 1, wherein the one or more parameters related to the foil bearing comprises temperature, strain, pressure, vibration, or combinations thereof.

11. The rotary machine of claim 1, wherein the fiber optic sensing system comprises a detection system configured to receive reflected light from the one or more fiber optic sensors via a sensing cable.

12. The rotary machine of claim 11, wherein the fiber optic sensing system comprises a controller configured to receive an output from the detection system and to detect one or more parameters related to the foil bearing system based on the output from the detection system.

13. The rotary machine of claim 12, wherein the rotary machine comprises an engine coupled to the controller;

wherein the controller is configured to throttle the engine when the detected one or more parameters related to the foil bearing system operation condition exceeds a threshold limit.

14. The rotary machine of claim 13, wherein the controller is configured to determine trending of one or more parameters related to the foil bearing system relative to time.

15. The rotary machine of claim 12, wherein the controller is configured to generate an alarm signal when the detected one or more parameters related to the foil bearing system exceeds a threshold limit.

16. A foil bearing system, comprising:
a bearing shell;
a top foil disposed in the bearing shell;
a bump foil disposed between the bearing shell and the top foil; and
a fiber optic sensing system comprising one or more fiber optic sensors disposed in a plurality of grooves provided in one of the bearing shell or the top foil and configured to detect one or more parameters related to the foil bearing system operation conditions.

17. The system of claim 16, wherein the fiber optic sensor comprises a fiber core and a metalized cladding disposed around the fiber core.

18. The system of claim 17, wherein the fiber optic sensor comprises a plurality of grating elements disposed in the fiber core; wherein the plurality of grating elements are spaced apart from each other.

19. The system of claim 18, wherein the grating elements comprises photosensitive doped fiber inscribed grating elements, quartz fiber grating elements, and sapphire fiber Bragg grating elements, or combinations thereof.

20. The system of claim 17, wherein the metalized cladding is welded to the groove.

21. The system of claim 17, wherein the metalized cladding is coupled to the groove using epoxy adhesive, ceramic adhesive, or combinations thereof.

22. The system of claim 16; wherein the fiber optic sensors are embedded in the bearing shell.

23. The system of claim 16, wherein the one or more parameters related to the foil bearing system comprises temperature, strain, pressure, vibration, or combinations thereof.

* * * * *